(12) United States Patent
Yang

(10) Patent No.: US 7,641,207 B2
(45) Date of Patent: Jan. 5, 2010

(54) FRONT SUSPENSION AND STEERING SYSTEM FOR CYCLES AND MOTORCYCLES WITHOUT TILTING OF THE FRONT WHEELS

(76) Inventor: Wang Li Yang, 8F, No. 27, Chung Shan Rd., Loo Chu Village, Tau-Yuan County (TW) 338

( * ) Notice: Subject to any disclaimer, the term of this patent is extended or adjusted under 35 U.S.C. 154(b) by 174 days.

(21) Appl. No.: 12/068,690

(22) Filed: Feb. 11, 2008

(65) Prior Publication Data

US 2009/0200766 A1  Aug. 13, 2009

(51) Int. Cl.
*B60G 21/00* (2006.01)
(52) U.S. Cl. .............................. 280/124.103; 180/210; 280/124.107; 280/267; 280/271
(58) Field of Classification Search ................ 180/210, 180/211, 215; 280/124.103, 124.107, 124.111, 280/267, 271
See application file for complete search history.

(56) References Cited

U.S. PATENT DOCUMENTS

| | | | |
|---|---|---|---|
| 4,003,443 A | 1/1977 | Boughers | |
| 4,375,293 A | 3/1983 | Solbes | |
| 4,887,829 A | 12/1989 | Prince | |
| 4,903,857 A * | 2/1990 | Klopfenstein | ............... 280/267 |
| 4,998,596 A * | 3/1991 | Miksitz | ..................... 180/213 |
| 5,116,069 A | 5/1992 | Miller | |
| 5,232,235 A * | 8/1993 | Brooks | ................. 280/87.042 |
| 5,240,267 A * | 8/1993 | Owsen | ....................... 280/240 |
| 5,730,453 A * | 3/1998 | Owsen | ....................... 280/282 |
| 6,328,125 B1 * | 12/2001 | Van Den Brink et al. | ..... 180/211 |
| 6,352,274 B1 * | 3/2002 | Redman | ..................... 280/248 |
| 6,435,522 B1 | 8/2002 | Van Den Brink et al. | |
| 6,547,027 B1 * | 4/2003 | Kalhok et al. | ............... 180/312 |
| 6,763,905 B2 | 7/2004 | Cocco et al. | |
| 7,073,806 B2 * | 7/2006 | Bagnoli | ....................... 280/267 |
| 7,090,234 B2 | 8/2006 | Takayanagi et al. | |
| 7,311,167 B2 | 12/2007 | Takayanagi et al. | |
| 7,494,141 B2 * | 2/2009 | Bouton | ................ 280/124.103 |
| 7,543,829 B1 * | 6/2009 | Barnes | ........................ 280/62 |
| 7,568,541 B2 * | 8/2009 | Pfeil et al. | ................... 180/210 |
| 7,591,337 B2 * | 9/2009 | Suhre et al. | ................. 180/210 |

* cited by examiner

*Primary Examiner*—Toan C To
(74) *Attorney, Agent, or Firm*—Bacon & Thomas, PLLC

(57) ABSTRACT

The present invention offers a front suspension and steering system for cycles and motorcycles. A mainframe with two front wheels and one rear wheel, the front wheels have flat surface tires, a 2-axial hub, having a wheel axle to support the two front wheels and a tilting axis below the wheel axle, a steering arm, having a tilting axle, the tilting axle can rotate in the tilting axis when the steering arm is tilting, the steering arm is connected to the mainframe by two wish bones and can rotate in the steeling axis. During turning, the body and the rear wheel are tilting to the side of turning to keep the center of gravity on the side of turning to balance the centrifugal force, but the front wheels and the 2-axial hub do not tilt, such that it is more stable and safe during turning.

7 Claims, 7 Drawing Sheets

(A)

(B)

(C)

FRONT SUSPENSION AND STEERING SYSTEM FOR CYCLES AND MOTORCYCLES WITHOUT TILTING OF THE FRONT WHEELS

BACKGROUND OF THE INVENTION

1. Field of the Invention

The present invention relates to a front suspension and steering system. In particular, the present invention relates to a front suspension and steering system for cycles and motorcycles without tilting of the front wheel during turning.

2. Description of the Related Art

Three wheel cycles or motorcycles have been proposed with both one-wheel steering and with front two-wheel steering of varied construction, which however do not permit the production to drive safely when it is turning nor emergency stop. Indeed, the general problems related to three wheel cycles or motorcycles may be in the lack of automobile stability during turning to the left or to the right side, the front wheel always tilt so that the tire surface is contact to the ground with its edge, thus decreasing the frictional force between the tires and the ground and resulting slip outwardly.

U.S. Pat. No. 4,375,293 to Solbes disclosed a suspension and steering system, during turning. Both the tires are tilt and the frictional force between the tires and the ground are restricted and resulting slip outwardly.

U.S. Pat. No. 5,116,069 to Miller et al disclosed a three-wheel vehicle has one front wheel and two rear wheels to improve safety of operation, and the front wheel is also tilted.

U.S. Pat. No. 6,435,522 to Van Den Brink et al disclosed a vehicle provided with a frame having two frame sections which are able to tilt with respect to one another. The front wheel is also tilted.

Therefore, there is a need to develop a cycles and motorcycles to overcome the shortcomings of the prior arts. The present invention provides a front suspension and steering system for cycles and motorcycles without tilting of the front wheel during turning.

OBJECTS OF THE INVENTION

It is therefore an object of the invention to provide a front suspension and steering system for cycles and motorcycles to use two flat surface tires for the front wheels to increase the contact area and frictional force of the tires with the ground, such that it is more stable and safe during breaking and turning.

It is another object of the invention to provide a front suspension and steering system for cycles and motorcycles to use a 2-axial hub, a tilting axle, a steeling axle and a steering arm as the steering device such that the front wheels will not tilt during turning.

It is yet another object of the invention to provide a front suspension and steering system for cycles and motorcycles to use a 2-axial hub, a tilting axle, a steeling axle and a steering arm as the steering device to simplifier the steering system and reduce the cost of the system.

DISCLOSURE OF THE INVENTION

A first aspect of the present invention teaches a front suspension and steering system for cycles and motorcycles, with two flat surface tires for the front wheels, the steering device of the front wheel including a 2-axial hub, a tilting axle, a steeling axle and a steering arm such that the front wheel will not tilt during turning, consists the following: A mainframe with two front wheels and one rear wheel, the front wheels have flat surface tires; A 2-axial hub, having a wheel axle to support the two front wheels and a tilting axis below the wheel axle, the tilting axis is longitudinal and perpendicular to the wheel axle; A steering arm, the steering arm is in L shape, having a tilting axle, the tilting axle can rotate in the tilting axis when the steeling arm is tilting, the steering arm is connected to the mainframe by two wish bones; A steeling axle, the steeling axle can rotate in a steeling axis when the steeling arm is turning.

Another preferred embodiment of the present invention teaches a front suspension and steering system for cycles and motorcycles, the steering arm is in rotated 180° L shape, and the steering axle is between the wish bones, the steeling axle can rotate in the steeling axis on the mainframe when turning.

Another preferred embodiment of the present invention teaches a front suspension and steering system for cycles and motorcycles, the steering arm is in reversed Y shape, and the tilting axle is between the tips of the steering arm.

BRIEF DESCRIPTION OF THE DRAWINGS

The foregoing and other advantages of the invention will be more fully understood with reference to the description of the best embodiment and the drawing wherein:

FIG. 2(A) is the front view of the front wheel system.

FIG. 2(B) is the side view of the front wheel system.

FIG. 2(C) is the cross-sectional view through the line A-A of FIG. 2 (B) of the front wheel system.

FIG. 3(A) is the front view.

FIG. 3(B) is a cross-sectional view through the line A-A of FIG. 3 (A).

FIG. 5(A) is the front view.

FIG. 5(B) is a cross-sectional view through the line A-A of FIG. 5 (A).

DESCRIPTION OF THE PREFERRED EMBODIMENTS

Figure 1:
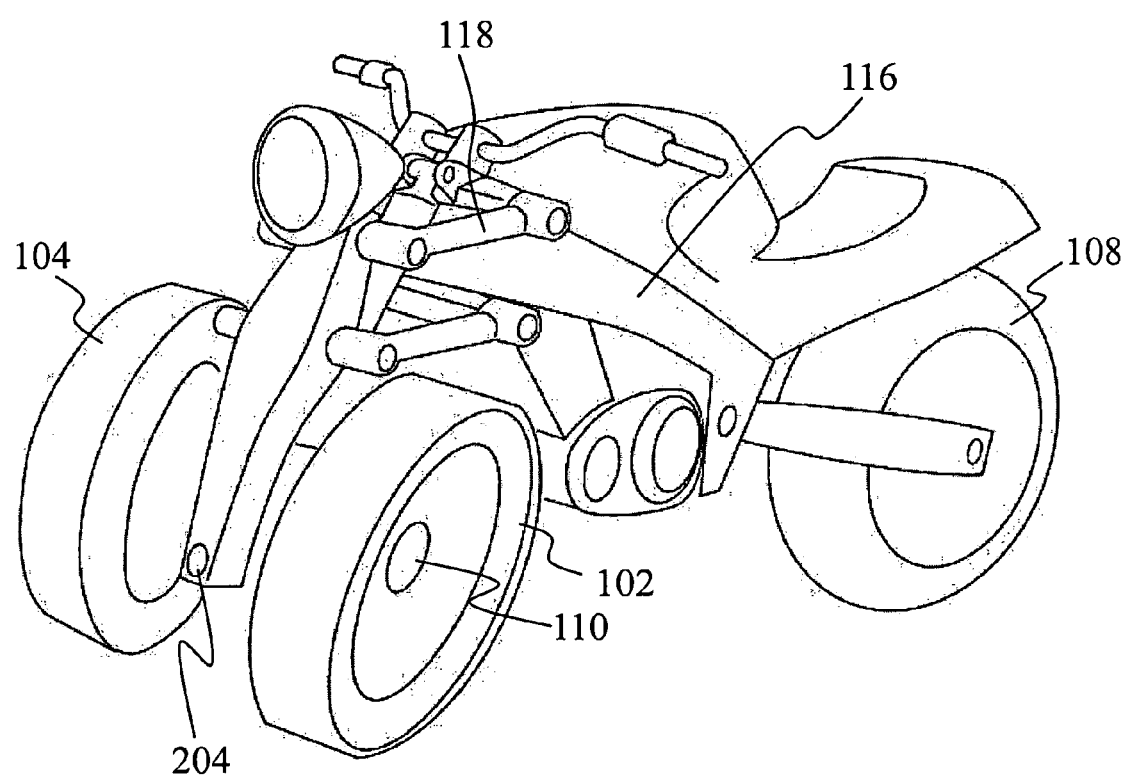
FIG. 1 is a perspective view showing a motorcycles turning to the left according to an embodiment of the present invention.

The foregoing and other advantages of the invention will be more fully understood with reference to the description of the best embodiment and the drawing as the following description.

Refer to FIG. 1, FIG. 1 is a perspective view showing a motorcycle turning to the left according to an embodiment of the present invention. A motorcycle 100 with front wheels 102 and 104 which is sustained by a wheel axis 110 which is fixed to a 2-axial hub 202 (see FIG. 2), a steeling arm 302 (see FIG. 3) is connected to the mainframe 116 by a pair of wish bones 118, and a rear wheel 108. Note that the front wheels 102 and 104 both have a flat surface, the contact area of the tires with the ground is increased and the frictional force of the tires with the ground is also increased, such that it is more stable and safe during breaking and turning. The function is provided by a 2-axial hub 202 as described bellow.

Figure 2:
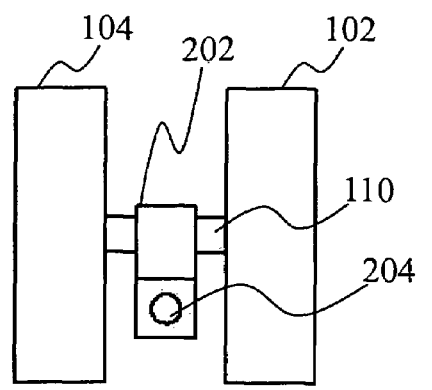
FIG. 2 is the front view, side view and cross sectional view of a front wheel system.
Figure 2:
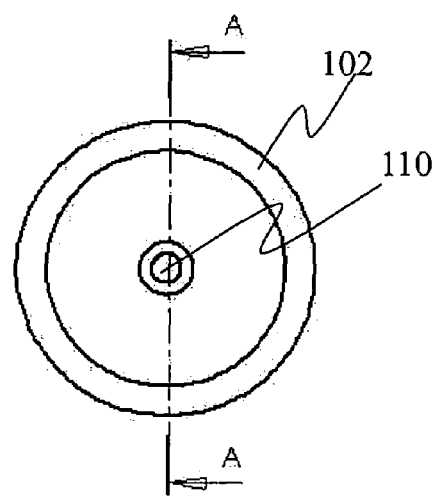
Figure 2:
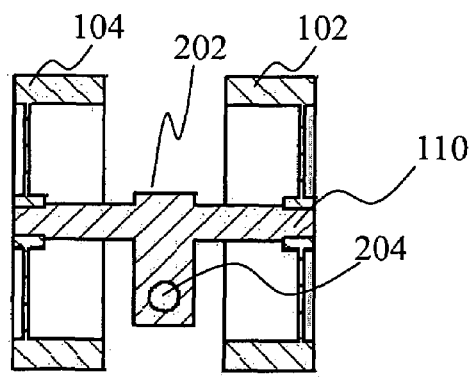

Refer to FIG. 2. FIG. 2 is the front view, side view and cross sectional view of a front wheel system. FIG. 2(A) is the front view of the front wheel system. Front wheels 102 and 104 both have a flat surface, and are supported by a wheel axle 110 of the 2-axial hub 202, below the wheel axle 110 of the 2-axial hub 106, there is a tilting axis 204, which is longitudinal and perpendicular to the wheel axle 110. FIG. 2(B) is the side view of the front wheel system. We can see the front wheel 102 and the wheel axle 110. FIG. 2(C) is the cross-sectional view through the line A-A of FIG. 2 (B) of the front wheel system. We can see the front wheels 102 and 104, the 2-axial hub 202, the wheel axle 110 is fixed on the 2-axial hub 202, below the wheel axle 110 there is a tilting axis 204.

Figure 3:
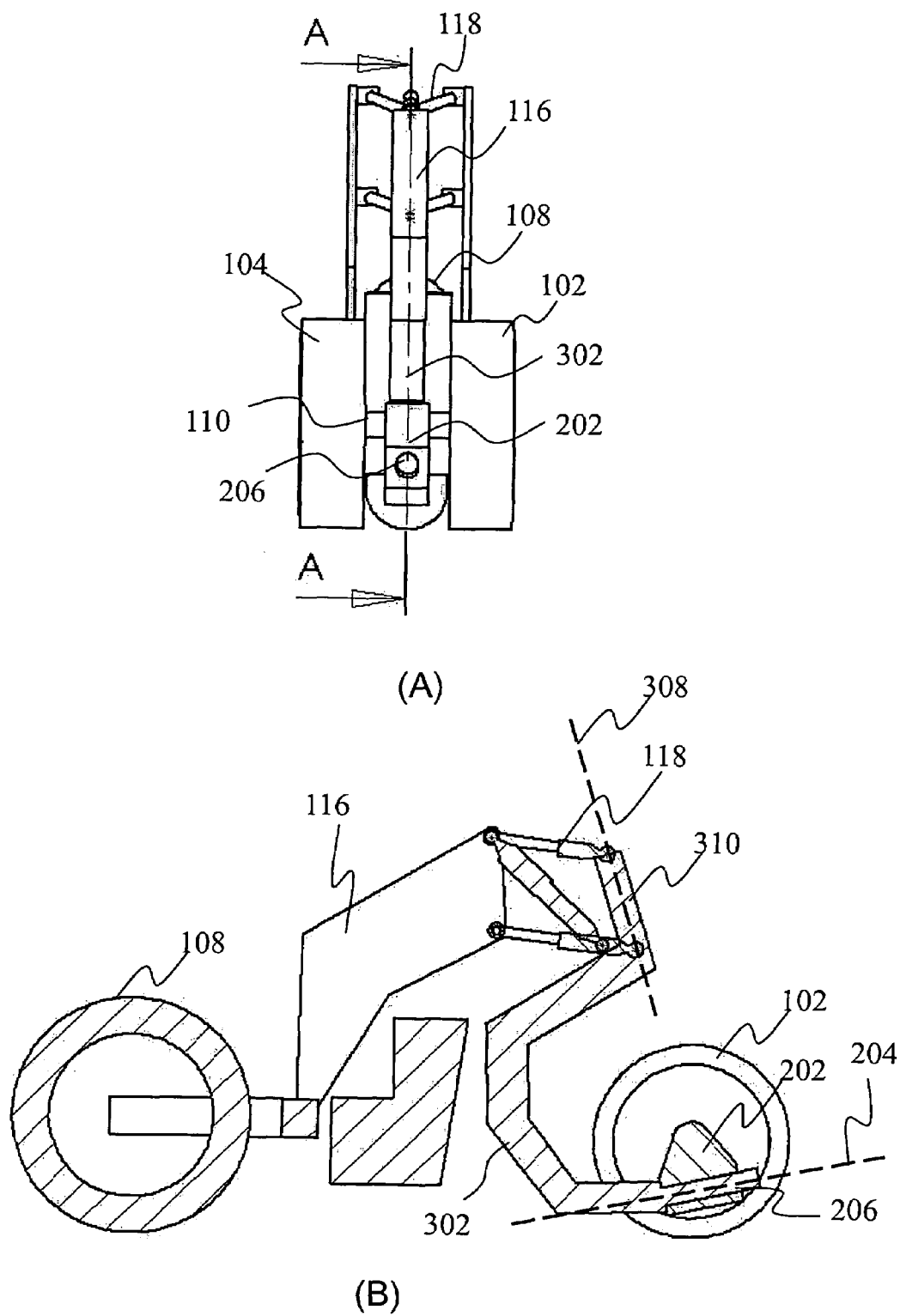
FIG. 3 is the front view and cross sectional view showing a motorcycle using a 2-axial hub and an L shape steering arm as the steering device according to an embodiment of the present invention.

Refer to FIG. 3. FIG. 3 is the front view and cross sectional view showing a motorcycle using a 2-axial hub, a steering arm as the steering device according to an embodiment of the present invention. FIG. 3(A) is the front view. We can see the motorcycle has flat surface front wheels 102 and 104 sustained by a wheel axle 110 which is fixed to a 2-axial hub 202. A rear wheel 108 is a traditional wheel with curved surface. FIG. 3(B) is a cross-sectional view through the line A-A of FIG. 3(A). The cross section goes through the rear wheel 108, the 2-axial hub 202, the tilting axle 206 and the steeling axis 308. The tilting axle 206 is on the lower end of the steering arm 302 and the tilting axle 206 can rotate in the tilting axis 204 when the steeling arm 302 is tilting, the steering arm 302 is connected to the mainframe 116 by a pair of wish bones 118. The steeling axle 310 is on the upper end of the steeling arm 302, and can rotate in the steeling axis 308 on the mainframe 116 when turning. Outside the cross section, there also shows the front wheel 102 and the traditional wish bones 118.

Figure 4:
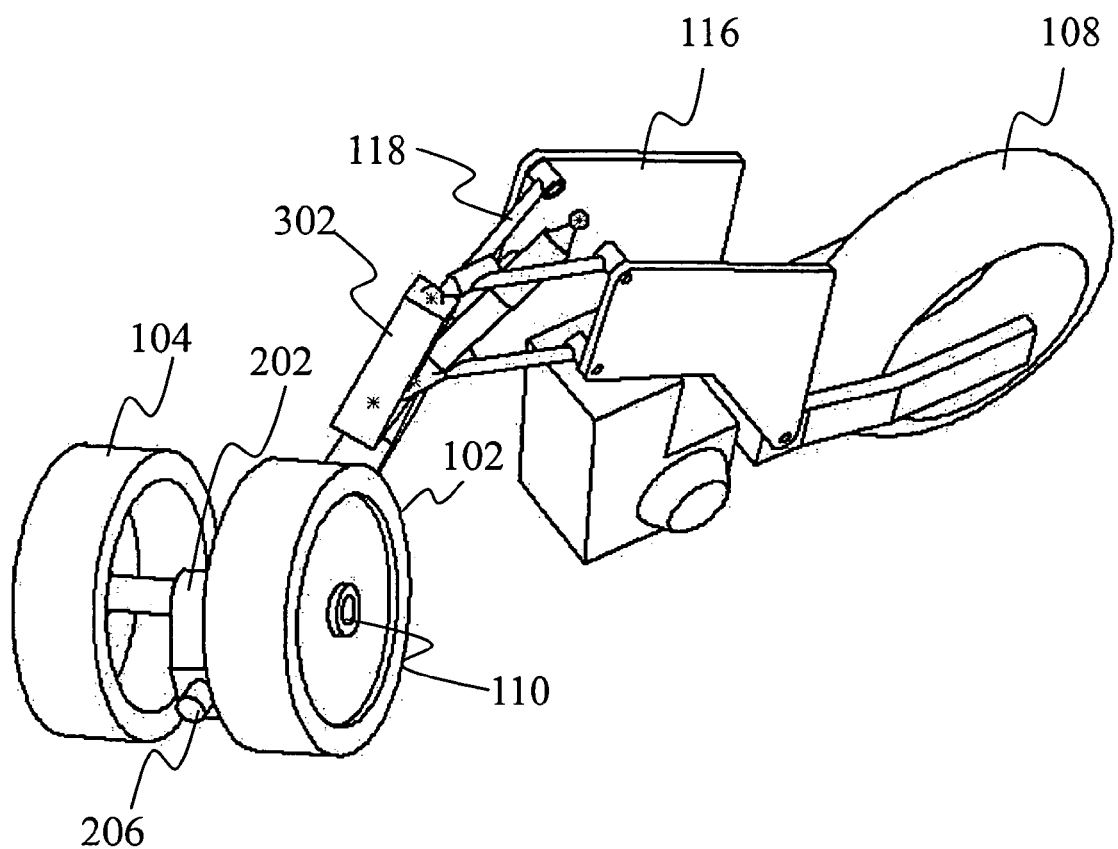
FIG. 4 is a schematic representation of the motorcycle of FIG. 3 when it is turning to the left.

Refer to FIG. 4. FIG. 4 is a schematic representation of the motorcycle of FIG. 3 when it is turning to the left. When the motorcycle is turning to the left, as the steering arm 302 is turned to the left, the body and the rear wheel 108 are tilt to the left to keep the center of gravity on the left side to balance the centrifugal force, but the front wheels 102 and 104 and the 2-axial hub 202 are not tilt since the tilting axle 206 on the lower end of the steering arm 302 rotates in the tilting axis 204 when the steering arm 302 is turned to the left. The flat surface tires still contact with the ground and then increase the contact area and frictional force of the tires with the ground, such that it is more stable and safe during turning. The flat tire is also more stable and safe during braking, especially in emergency braking, since the braking distance will decrease with a flat tire surface.

Figure 5:
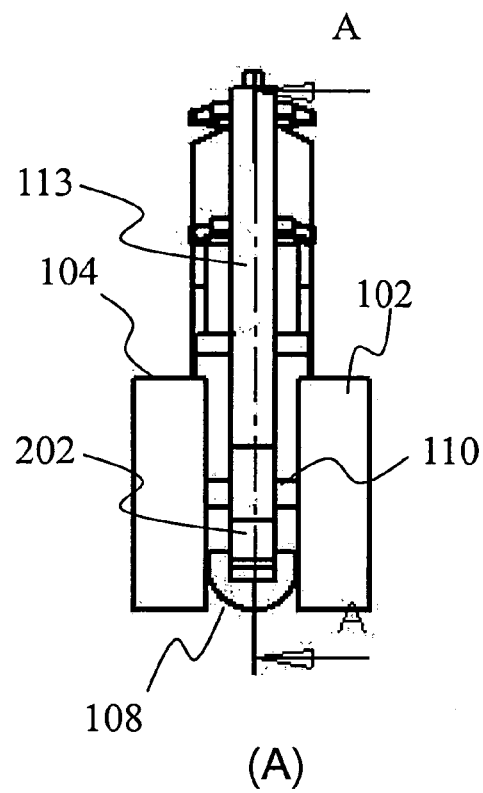
FIG. 5 is the front view and cross sectional view showing a motorcycle using a 2-axial hub and a rotated 180° L shape steering arm as the steering device according to an embodiment of the present invention.
Figure 5:
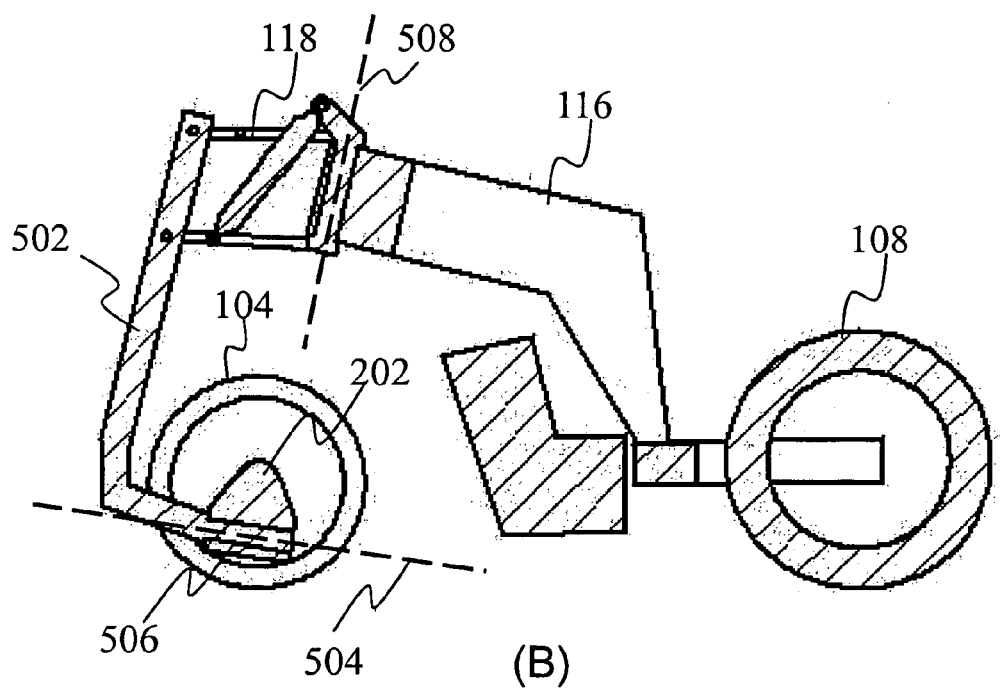

Refer to FIG. 5. FIG. 5 is the front view and cross sectional view showing a motorcycle using a 2-axial hub and a rotated 180° L shape steering arm as the steering device according to an embodiment of the present invention. FIG. 5(A) is the front view. We can see the motorcycle has flat surface front wheels 102 and 104 sustained by a wheel axle 110 which is fixed to a 2-axial hub 202. A rear wheel 108 is a traditional wheel with curved surface. FIG. 5(B) is a cross-sectional view through the line A-A of FIG. 5(A). The cross section goes through the rear wheel 108, the 2-axial hub 202, the tilting axle 506 is the same as that of FIG. 3(B), but the steeling axis 508 is different from that of FIG. 3(B) and is on the mainframe 116. The steering arm 502 is in rotated 180° L shape, the tilting axle 506 is on the lower end of the steering arm 502, and the tilting axle 506 can rotate in the tilting axis 504 when the steeling arm 502 is tilting, the steering arm 502 is connected to the mainframe 116 by a pair of wish bones 118. The steeling axle (not shown) is between the wish bones near the side of the mainframe, and can rotate in the steeling axis 508 on the mainframe 116 when turning. Outside the cross section, there also shows the front wheel 104 and the traditional wish bones 118.

Figure 6:
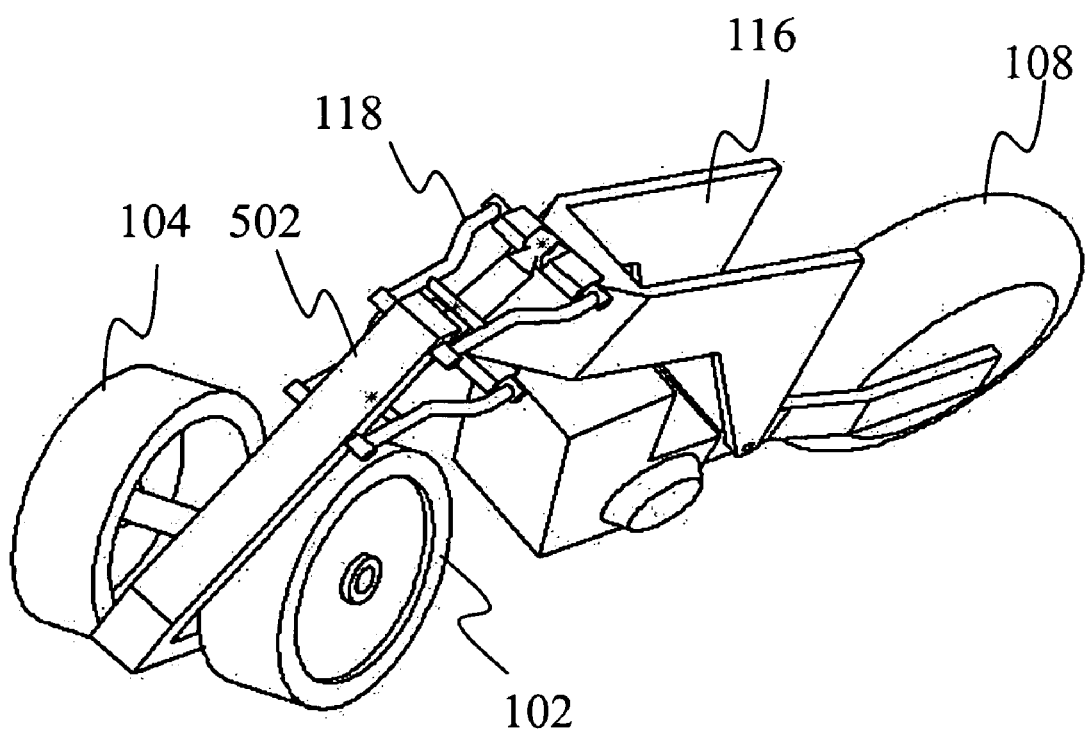
FIG. 6 is a schematic representation of the motorcycle of FIG. 5 when it is turning to the left.

Refer to FIG. 6. FIG. 6 is a schematic representation of the motorcycle of FIG. 5 when it is turning to the left. When the motorcycle is turning to the left, as the steering arm 502 is turned to the left, the body and the rear wheel 108 are tilted to the left to keep the center of gravity on the left side to balance the centrifugal force, but the front wheels 102 and 104 and the 2-axial hub 202 are not tilt since the tilting axle 506 on the lower end of the steering arm 502 rotates in the tilting axis 504 when the steering arm 502 is turned to the left. The flat surface tires still contact with the ground and then increase the contact area and frictional force of the tires with the ground, such that it is more stable and safe during turning. The flat tire is also more stable and safe during braking, especially in emergency braking, since the braking distance will decrease with a flat tire surface.

Figure 7:
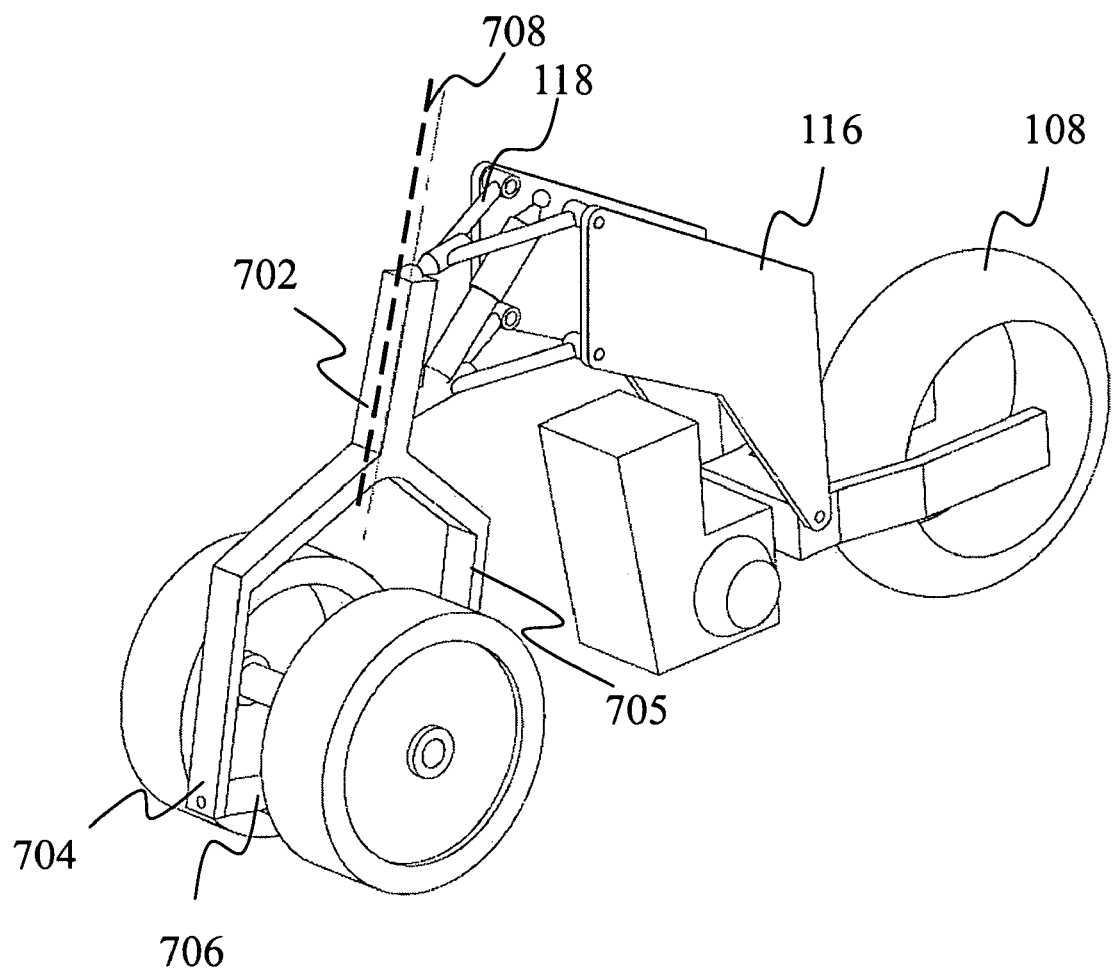
FIG. 7 is a schematic representation of a motorcycle using a 2-axial hub and a steering arm as the steering device but the steering arm is in reversed Y shape according to another embodiment of the present invention.

Another preferred embodiment is shown in FIG. 7. FIG. 7 is a schematic representation of a motorcycle using a 2-axial hub and a steering arm as the steering device but the steering arm is in reversed Y shape according to another embodiment of the present invention. The steering arm 702 has a front arm 704 and a rear arm 705. The steering arm 702 is in reversed Y shape, and the tilting axle 706 is between the lower ends of the front arm 704 and the rear arm 705. The steeling axle is also on the upper end of the steeling arm 702, and can rotate in the steeling axis 708 on the mainframe 116 when turning, the steering arm 702 is connected to the mainframe 116 by a pair of wish bones 118. This structure results more stable and uniform driving force applied to the tiling axle 706.

Although specific embodiments of the invention have been disclosed, it will be understood by those having skill in the art that minor changes can be made to the form and details of the specific embodiments disclosed herein, without departing from the scope of the invention. The embodiments presented above are for purposes of example only and are not to be taken to limit the scope of the appended claims.

What is claimed is:

1. A front suspension and steering system for cycles and motorcycles, with two flat surface tires for the front wheels, the steering device of the front wheel including a 2-axial hub, a tilting axle, a steeling axle and a steering arm such that the front wheel will not tilt during turning, comprising:
   a mainframe with two front wheels and one rear wheel, said front wheels have flat surface tires;
   a 2-axial hub, having a wheel axle to support the two front wheels and a tilting axis below said wheel axle, said tilting axis is longitudinal and perpendicular to said wheel axle;
   a steering arm, having a tilting axle, said tilting axle can rotate in said tilting axis when said steeling arm is tilting, said steering arm is connected to said mainframe by two wish bones;
   a steeling axle, said steeling axle can rotate in a steeling axis when said steeling arm is turning.

2. A front suspension and steering system as recited in claim 1, wherein said steering arm is in L shape, said tilting axle is on the lower end of said steering arm.

3. A front suspension and steering system as recited in claim 2, wherein said steeling axle is on the upper end of said steeling arm, and can rotate in said steeling axis on said mainframe when turning.

4. A front suspension and steering system as recited in claim 1, wherein said steering arm is in rotated 180° L shape, said tilting axle is on the lower end of said steering arm.

5. A front suspension and steering system as recited in claim 4, wherein said steeling axle is between said wish bones near the side of said mainframe, said steeling axle can rotate in said steeling axis on said mainframe when turning.

6. A front suspension and steering system as recited in claim 1, wherein said steering arm is in reversed Y shape, said tilting axle is between the lower ends of said steering arm.

7. A front suspension and steering system as recited in claim 6, wherein said steeling axle is on the upper end of said steeling arm, and can rotate in said steeling axis on said mainframe when turning.

* * * * *